Figure 4:
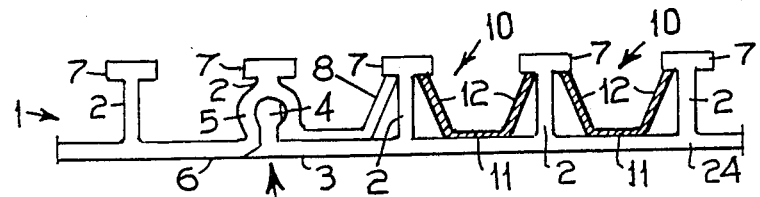

United States Patent [19]

Menzel

[11] Patent Number: 4,977,931
[45] Date of Patent: Dec. 18, 1990

[54] METHOD OF PRODUCING REINFORCED RIBBED TUBES

[75] Inventor: Stanley W. O. Menzel, Burnside, Australia

[73] Assignee: Rib Loc Australia Pty. Ltd., The Levels, Australia

[21] Appl. No.: 191,163

[22] PCT Filed: Jun. 30, 1987

[86] PCT No.: PCT/AU87/00190
§ 371 Date: Mar. 3, 1988
§ 102(e) Date: Mar. 3, 1988

[87] PCT Pub. No.: WO88/00129
PCT Pub. Date: Jan. 14, 1988

[30] Foreign Application Priority Data

Jul. 3, 1986 [AU] Australia .............................. PH06719
Apr. 6, 1987 [AU] Australia ................................ PI1267

[51] Int. Cl.$^5$ ............................................ F16L 11/11
[52] U.S. Cl. ..................... 138/154; 138/122; 138/129; 138/174
[58] Field of Search ................ 138/129, 154, 121, 122, 138/174, 172, 134; 29/450, 454

[56] References Cited

U.S. PATENT DOCUMENTS

| 2,354,485 | 7/1944 | Slaughter | 138/129 |
| 2,739,089 | 3/1956 | Hegeltorn . | |
| 4,129,152 | 12/1978 | Davis | 138/129 |
| 4,301,200 | 11/1981 | Langenfeld et al. . | |
| 4,354,051 | 10/1982 | Kutnyak | 138/129 |
| 4,566,496 | 1/1986 | Menzel et al. | 138/154 |
| 4,589,448 | 5/1986 | de Valle | 138/154 |
| 4,719,945 | 1/1988 | Richards et al. | 138/154 |
| 4,824,502 | 4/1989 | Nagayoshi et al. | 138/154 |

FOREIGN PATENT DOCUMENTS

| 479186 | 2/1974 | Australia . | |
| 527417 | 10/1977 | Australia . | |
| 0143659 | 6/1985 | European Pat. Off. | 138/134 |
| 2045069 | 9/1970 | Fed. Rep. of Germany . | |
| 85/00009 | 1/1985 | PCT Int'l Appl. . | |

Primary Examiner—James E. Bryant, III
Attorney, Agent, or Firm—Gordon L. Peterson

[57] ABSTRACT

The method of reinforcing a structure formed by interengaging the edges of ribbed strip (1) formed of a plastics material to form a helically wound tube, the strip (1) comprising a plurality of the ribs (2) spaced apart and upstanding from a base (24), characterized by engaging on the strip (1) a non-planar reinforcing member (10), and locking the reinforcing member (10) to the strip to form an attached strength member to attain lateral stability of the ribs.

8 Claims, 2 Drawing Sheets

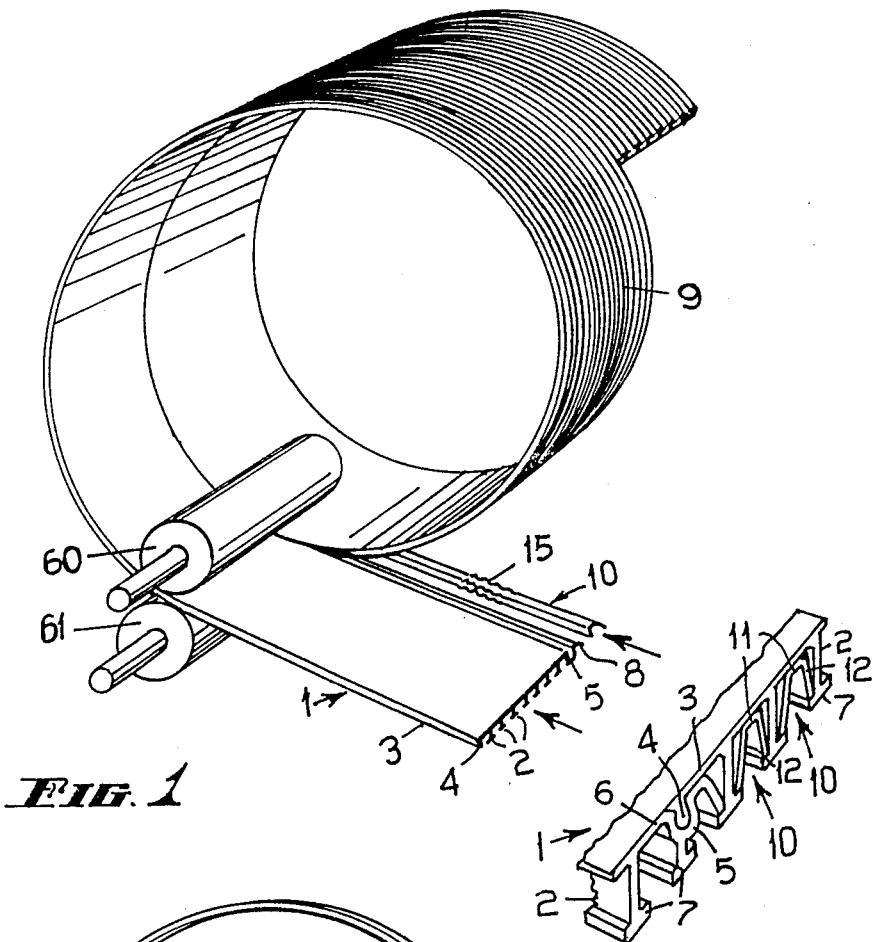
FIG. 1
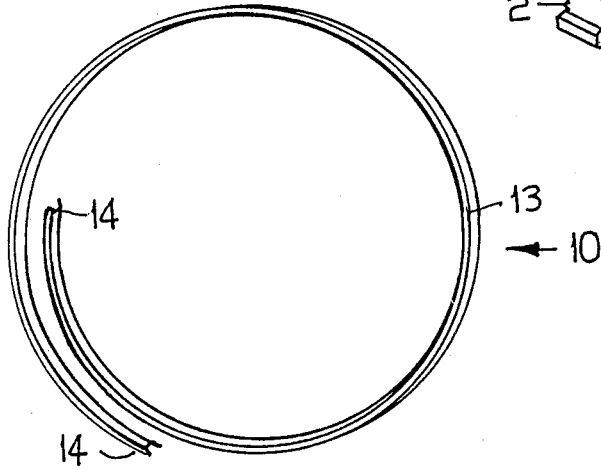
FIG. 2
FIG. 3

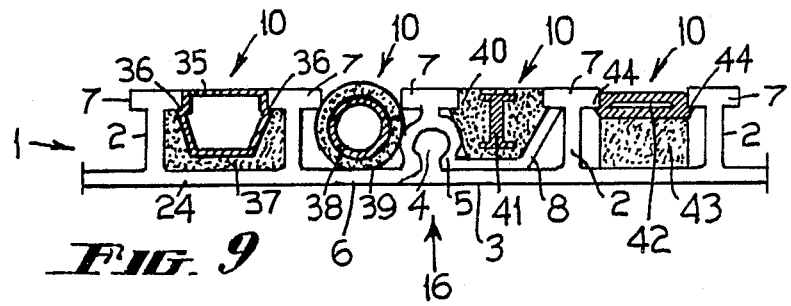
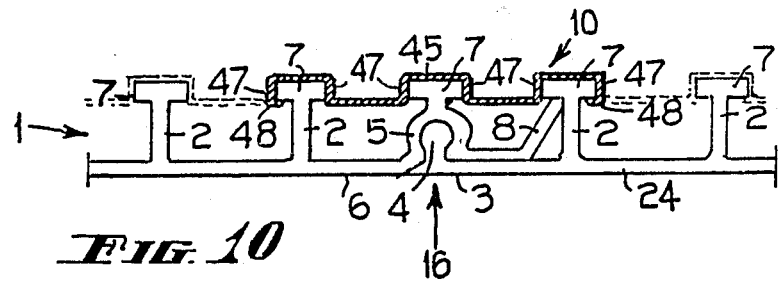
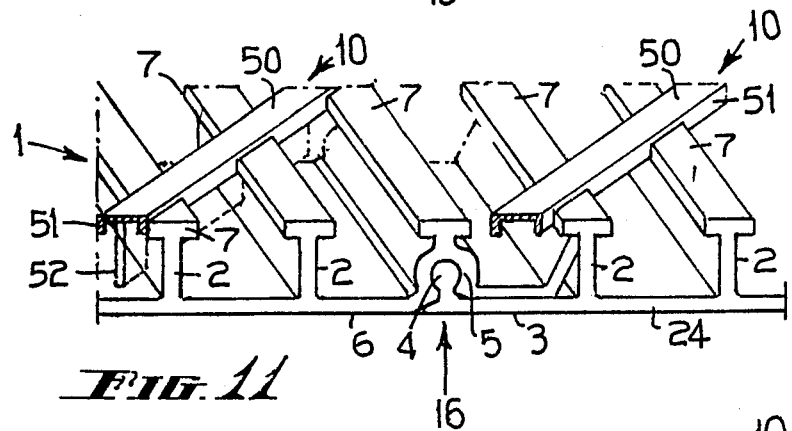
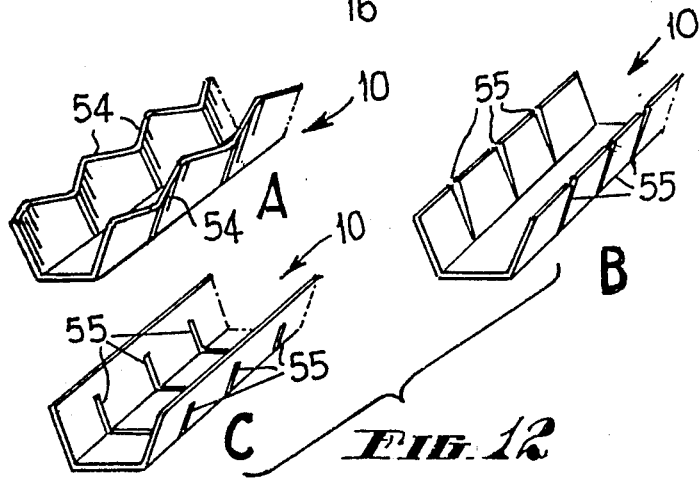

METHOD OF PRODUCING REINFORCED RIBBED TUBES

This invention relates to a method of and means for producing reinforced ribbed structures, particularly tubes but has application also to panels, but in particular it relates to structures of the type in which a strip having a series of upstanding ribs on at least one face and interengaging edge means is used.

This form of helically wound tube is already well known and is described in patents by the same Inventor relating both to the form of the strip and the form of the machine by means of which the tubes are produced from such strips.

It is a well established fact that a helical, sometimes referred to as a spiral, tube of a plastics material with a ribbed configuration forms an attractive method of producing low cost tubes for water, sewers and the like.

One problem with such tubes is that because such tubes are made from thermoplastic materials, they have a low modulus of elasticity to the point that to meet the deflection criteria when buried in a trench or subject to high earth loads, such tubes need to have relatively high ribs and a substantial wall thickness.

The object of the present invention is to provide certain improvements to the method of manufacture and the tube itself formed according to this invention and this improvement is achieved according to this invention by reinforcing members associated with the tube so formed, which reinforcing members may comprise relatively rigid members in strip form of selected cross section, which reinforcing members locked on to or placed between or embedded in the structure in such a manner that the deflection resistance of such a tubular object is materially increased.

It is of course already known to reinforce tubing, such for instance as used in vacuum lines, by steel springs or the like wound into the wall of the tube during manufacture or associated with the tube after manufacture by embedding the wire spring material or the like in a groove in the material, but the object of the present invention is to stiffen the ribs in at least a generally radial direction, although some lateral stiffening may also be necessary.

It has been found that when a helically wound plastic tube is placed in a trench and backfilled with sand or gravel and a load is applied on top of the backfilled tube, the load can be a wheel of a laden truck or by simply a force from a hydraulic jack on to a steel plate, which in turn deflects the buried test pipe to destruction, the failure mode is one which deforms the crown of the pipe, leaving the rest of the pipe in good order. The particular failure point is when the tube is deformed beyond its elastic limit the helical seam springs open and the sand backfill under load then quickly flows to the failure point further exaggerating the problem as the 'domino effect' takes over because the ribbed configuration then collapses sideways.

One of the problems of course of winding a strip or the like into such a structure, such as by engaging it to be upstanding along the wall of T-shaped ribs or the like, is to be able to achieve the required circular configuration when the face of such material is radially disposed and to still allow the strip to be closely accommodated to the ribs when the strip from which they are formed is bent into a helical formation to form the tube, and the invention therefore is designed so that while withstanding generally radial loads the reinforcing ribbon or the like may be corrugated laterally or so formed that it can be bent to a circular configuration. The invention is however not limited to tubular structures but applies also to panels having a similar rib structure.

The reinforcing member can be locked on to or placed between ribs in such a manner that the member considerably increases the deflection resistance of such objects but instead of using a metal reinforcing member, a strip of fiberglass, saturated with a plastic resin such as epoxy or polyester, may be used.

The steel or other reinforcing member can be encased in a resilient or a plastic sheath to avoid corrosion or absorb shocks, or the reinforcing member may be made from a material such as stainless steel which will not be subject to deterioration by the elements or conditions under which it is used.

The invention thus relates to a method of reinforcing a structure formed by interengaging the edges of plastics strip means to form a helically wound tube or a panel, said strip means comprising a plurality of ribs spaced apart and upstanding from a base of the strip means, characterised by engaging on the strip means a reinforcing member or members, and locking the reinforcing members to the strip means.

The means comprise a structure formed by interengaging the edges of plastics strip means to form a helically wound tube or a panel, the strip means comprising a plurality of ribs spaced apart and upstanding from a base of the strip means, characterised by at least a reinforcing member engaging the strip means, and by means locking the reinforcing member preferably to the strip means.

In order however that the nature of the invention will be fully understood, some embodiments will now be described with reference to the accompanying drawings but the drawings are to be taken as indicating the general principles of the invention and not necessarily to limit the invention to the form shown.

Figure 6:
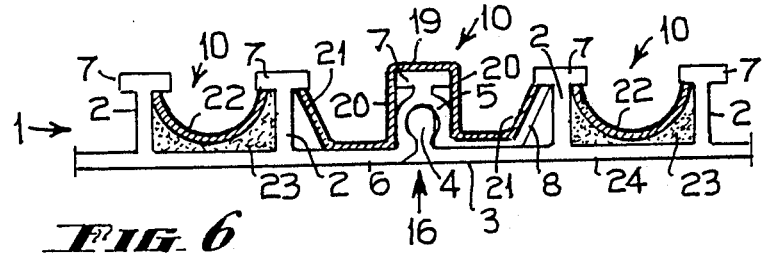
Figure 7:
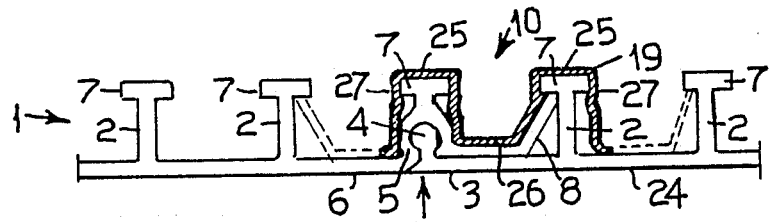
Figure 8:
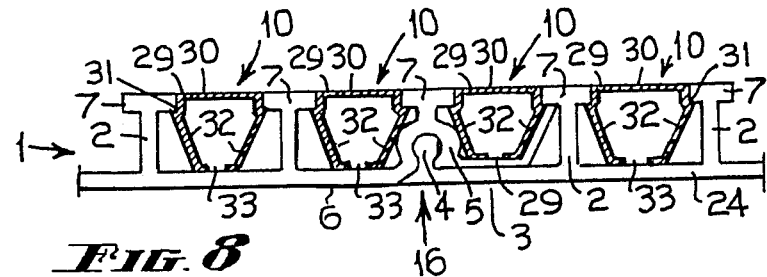

In the drawings;

FIG. 1 is a schematic view showing in perspective ribbed strip means being wound into a tube by overlapping the edges of adjacent convolutions and joining them together by interengaging longitudinally running interengaging members, showing also a reinforcing member being helically wound into the space between the ribs of the strip means, FIG. 2 is a perspective view of a reinforcing member segment which may be used, a number of these being spaced where required, this form being used when some diameter change of the tube occurs, FIG. 3 is an enlarged perspective schematic view of the overlapping edges of two convolutions of a strip of plastics material, showing the reinforcing member in place, this view and the following views being in the nature of end elevations of the strip of plastics material and the reinforcing member, FIGS. 4, 5, 6, and 7, show different forms of reinforcing members, and, FIG. 8 shows at A, B and C, how a reinforcing member, shown in perspective, can be formed to assist winding of the strip into tubular form.

It is to be stressed that the forms illustrated are exemplary only of many forms of reinforcing members which can be used.

In the following description similar integers in each figure will be given the same reference numerals but where necessary differences will be indicated by further reference numerals.

Referring first to FIG. 1, the ribbed strip means 1, formed from a plastics material, has upstanding ribs 2 on one face and has at one edge 3 a longitudinally running barb 4 adapted to engage a longitudinal socket 5 at the other edge 6 of the strip, each rib 2 having an expanded end 7, the edge 6 having a locking tail 8 projecting from its extremity as shown more particularly in FIG. 3. The tube is designated 9.

Referring first to the configuration of the concave reinforcing member 10 shown in FIG. 4, this comprises a metal or fiberglass strip 11 of U-shaped section with its side members 12 slightly splayed outwardly and these side members 12 may be corrugated as shown in FIG. 12A, this reinforcing member 10 being inserted between any of the ribs 2 which form part of the profile of the strip 1 which creates a tubular or planar object, the reinforcing members 10 being located between the ribs 2 of a helically wound tube or a panel being formed, or shorter sections may be used where an elongated reinforcing member is not required, the non-planar cross-section giving strength.

In this way a simple reinforcing member 10 can be positioned generally vertically between the upstanding ribs 2 which form part of the profile which is used to create such tubular or planar objects. It will be seen that the reinforcing member 10 generally extends across the space between the ribs 2 to be held between the ribs 2.

In the case of a tube 9, the reinforcing member 10, because of its configuration, not only holds the helical seam of the tube together but also adds to the deflection strength of the finished tube.

As shown in FIG. 2, the reinforcing member 10, instead of following the elongated helical path around the tube 9, may be made in sections of a length such that each section extends around the tube 9 with its edges overlapping a sufficient distance to provide a band 13 extending around the tube 9 to resist compression of the tube, but with the two ends 14 being free to move longitudinally in the spaces between the ribs 2 so that when compressed, the reinforcing member 10 as well as the tube 9 can temporarily be changed in diameter by the end portions 14 of the reinforcing member 10 moving the one relative to the other, but can then spring back to the original shape, where this is not required the helical reinforcing member 10 extends over substantial distances of the tube.

Instead of using the shorter sections of helically shaped bands 13 as the reinforcing members 10, the reinforcing member 10 can be continuous, but may be provided with transverse corrugations 15 at appropriate localities as shown in FIG. 1 which allow the metal reinforcing to adjust to changes in diameter of the tube when under pressure, and it will be realised that this transverse corrugation can extend the full length of the reinforcing member or can be applied at discrete intervals along its length.

The reinforcing member 10, when of "U" shape as described, is proportioned to have the somewhat outturned side members 12 of the strip 11, which forms the reinforcing member 10, being engaged underneath the expanded ends 7 of "T" shaped ribs 2.

Referring now to the form shown in FIG. 4 the two overlapping edges 3 and 6 of the ribbed plastics strip means 1, whether helically wound or in the form of a panel, are shown with an interengaging lock 16 of generally approved and presently used design, the one edge 6 having the socket 5 which is engaged by a complementary barb 4 on the other edge 3 and including a tail 8 projecting from the socket 5 to engage beneath the next rib 2 in the series to form an effective lock.

The reinforcing strip 10, which has two side members 12, is positioned in the cavity between a pair of adjacent ribs 2 with the edges of the side members 12 engaged beneath the expanded ends 7 of the ribs 2 to firstly lock the reinforcing strip 10 in position between the ribs 2 and secondly to maintain the spacing of the ribs 2 under load where for instance the outer ends of the ribs may tend to be deflected laterally.

Figure 5:
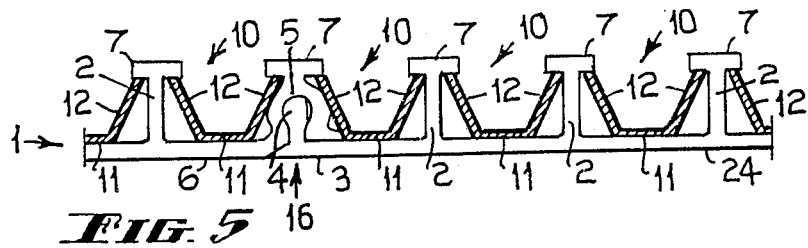

FIG. 5 shows a configuration of a strip of plastics material similar to that shown in FIG. 4 but the locking tail 8 is omitted, side members 12 of the concave reinforcing members 10 engaging the socket 5 of the join to prevent withdrawal of the barb 4 from the socket 5 at the lock 16 of the adjacent edges of the strip means 1.

In FIG. 6 is again shown a similar configuration of a strip of plastics material to that illustrated with reference to FIG. 4 but in this case the concave reinforcing member 10 is in the nature of a strip 19 shown as spanning the join formed by the socket 5 and barb 4, the central portion of a strip 19 being shaped to lock the barb 4 and socket 5 together when it has been applied, the central portion 19 having extensions 20 which terminate in angularly disposed tails 21 which engage beneath the expanded portions of the two adjacent ribs 2 to thus form a firm lock at the join but because of its shape also ensuring that the strength of the join under load is greatly enhanced.

This reinforcing member 10 can be wound over, for instance, a pipe 9 as it is being formed or it can be locked in place when a series of strip means 1 are used to form a panel to enhance the strength of the structure as well as making the join stronger and more effective.

FIG. 6 is a compound view showing remote of the just described reinforcing member 10 a modified form of reinforcing member 10 in which the strip 22 is of arcuate form which can be clipped into the hollow between a pair of ribs 2, the strip 22 in this case having on its underside a resilient pad 23 which can be attached to the strip 22 or can be separately wound into the hollow between the ribs 2 before the strip 22 is applied the purpose of this being to still have the aligning effect on the ribs 2 when a series of these reinforcing strips 22 are placed adjacently along the length of a tube 9 or panel but serving also as cushioning means by distributing load directed on to them by, for instance, earth when they are embedded so that the earth stress is transmitted through the resilient pad 23 to the base 24 of the plastic ribbed strip 1.

FIG. 7 shows a modification of the reinforcing member 10 shown in FIG. 6, the strip 19 which forms the reinforcing member 10 in this case having a pair of channel shaped members 25 which engage over the expanded ends 7 of two adjacent ribs 2 and have the portion 26 between the ribs extending down to engage the locking tail 8 of the ribbed plastics strip 1 and force it tightly into its locked position, the two end walls 27 extending towards the base and again, as in FIG. 6, the one channel shaped member 25 locks the barb 4 and socket 5 firmly together when applied.

Any number of ribs can be engaged by the reinforcing member 10 by laterally extending the width of the strip in a shape as generally defined. The dotted lines show also how the ends of the strip 19 can be extended to engage beneath the expanded ends 7 of the ribs 2.

FIG. 8 shows a reinforcing member 10 similar to that used in FIG. 4, but showing at A how the walls of the member can have corrugations 54 formed in them to allow the reinforcing member 10 to be more readily bent into a curved form such as when using it on a tube as 9.

At B of FIG. 8 is shown how the walls of the reinforcing member 10 can have slits 55 to allow the required curvature to be readily attained. C of FIG. 12 showing how the slits 55 can be formed from the opposite direction to again facilitate the curving of the strip.

The method of application of the reinforcing member 10 can vary but may be as shown in FIGS. 1 and 3 where the strip of plastics material 1 is fed between driven joining rollers 60 and 61 to interlock two edge portions of the convolutions of the strip 1 of plastics material, the reinforcing member 10 being fed on to the strip 1 and pressed into position by the rollers 60 and 61. The reinforcing member 10 can be fed continually or at required intervals and may be positioned between ribs or over the join formed at the contiguous edges.

It will be obvious that other forms which facilitate bending of the reinforcing member 10 can be used, and it will also be appreciated that such configurations as shown in FIG. 8 or extensions thereof can be applied to any of the other forms of reinforcing member illustrated herein.

It is also clear that the ends of the ribs 2 need not necessarily be expanded as indicated by 7 as the reinforcing member 10 can be located between the ribs by tension in the case of helically wound tubes or by being located by notches or other configuration in tubes or panels.

I claim:

1. A method of reinforcing a structure comprising joining edge portions of at least one ribbed strip formed of a plastics material to form a tube wherein said ribbed strip comprises an array of flanged ribs spaced apart between said edge portion and upstanding from a common base, engaging at least one outwardly opening concave reinforcing member at least between adjacent flanged ribs within the array to interlock edges of the reinforcing member with the flanges of the adjacent ribs and constitute a means for increasing the deflection resistance of the structure.

2. The method of claim 1 wherein the step of joining includes feeding said ribbed strip between joining rollers to form the tube and to lock the edge portions of adjacent convolutions of said ribbed strip together, and the step of engaging includes feeding said reinforcing member between said joining rollers to engage said reinforcing member between said adjacent flanged ribs.

3. The method of claim 2 wherein the step of joining includes continuously feeding said reinforcing member between adjacent flanged ribs as said ribbed strip is formed into the tube whereby to helically wind said reinforcing member onto said tube.

4. The method of claim 2 wherein the step of joining includes intermittently feeding said reinforcing member between adjacent flanged ribs of said ribbed strip as said ribbed strip is formed into the tube whereby to helically wind said reinforcing member onto said tube.

5. The method of claim 1 wherein adjacent ribbed strip edge portions include a different one of a barb or a socket, and the step of joining includes engaging said barb at one of said adjacent ribbed strip edge portions with said socket at the other of said adjacent ribbed edge portions.

6. The method of claim 1 wherein said reinforcing member is a metallic reinforcing member.

7. The method of claim 1 including placing a resilient pad between the reinforcing member and the ribbed strip.

8. The method of claim 1 including placing a reinforcing strip over the joined together edge portions of the ribbed strip and interlocking the reinforcing strip with the flanges of ribs adjacent to the joined together edge portions of the ribbed strip.

* * * * *